US012435761B2

United States Patent
Spicer

(10) Patent No.: US 12,435,761 B2
(45) Date of Patent: Oct. 7, 2025

(54) UNIVERSAL JOINT AND METHOD

(71) Applicant: Bryan Logan Spicer, Dublin, CA (US)

(72) Inventor: Bryan Logan Spicer, Dublin, CA (US)

( * ) Notice: Subject to any disclaimer, the term of this patent is extended or adjusted under 35 U.S.C. 154(b) by 336 days.

(21) Appl. No.: 18/318,553

(22) Filed: May 16, 2023

(65) Prior Publication Data

US 2023/0375046 A1    Nov. 23, 2023

Related U.S. Application Data

(60) Provisional application No. 63/343,890, filed on May 19, 2022.

(51) Int. Cl.
| | | |
|---|---|---|
| *G01M 1/32* | (2006.01) |
| *F16D 3/32* | (2006.01) |
| *F16D 3/38* | (2006.01) |

(52) U.S. Cl.
CPC ............... *F16D 3/32* (2013.01); *G01M 1/32* (2013.01); *F16D 3/382* (2013.01); *F16D 2300/22* (2013.01)

(58) Field of Classification Search
CPC ........ F16D 3/32; F16D 3/382; F16D 2300/22; G01M 1/32
USPC ................................ 464/118, 119, 125, 180
See application file for complete search history.

(56) References Cited

U.S. PATENT DOCUMENTS

| | | | |
|---|---|---|---|
| 686,027 A * | 11/1901 | Carpenter | F16D 3/2052 464/119 |
| 724,068 A | 3/1903 | Williams | |
| 2,957,353 A * | 10/1960 | Babacz | F16C 1/00 464/119 |
| 5,376,049 A | 12/1994 | Welschof et al. | |
| 5,496,219 A * | 3/1996 | Anspach, Jr. | F16D 3/38 464/119 |
| 6,251,020 B1 | 6/2001 | Cornay | |

OTHER PUBLICATIONS

International Search Report and Written Opinion dated Aug. 24, 2023 in International Patent Application No. PCT/US23/22601.

* cited by examiner

*Primary Examiner* — Greg Binda
(74) *Attorney, Agent, or Firm* — Procopio, Cory, Hargreaves & Savitch LLP

(57) ABSTRACT

A universal joint comprising a first ring cross link configured to be coupled to a driving yoke; a second ring cross link configured to be coupled to a driven yoke; an internal coupling yoke operably coupling yoke coupling the first ring cross link and the second ring cross link together, wherein at least one of the internal coupling yoke, the first cross link, and the second cross link include a wobble joint where the internal coupling yoke is coupled to the first cross link and/or the second cross link.

7 Claims, 6 Drawing Sheets

UNIVERSAL JOINT AND METHOD

FIELD OF THE INVENTION

The present invention relates, in general, to constant velocity joints, and, in particular, to a constant velocity universal joints.

SUMMARY OF THE INVENTION

An aspect of the disclosure involves a universal joint comprising a first ring cross link configured to be coupled to a driving yoke; a second ring cross link configured to be coupled to a driven yoke; an internal coupling yoke operably coupling yoke coupling the first ring cross link and the second ring cross link together, wherein at least one of the internal coupling yoke, the first cross link, and the second cross link include a wobble joint where the internal coupling yoke is coupled to the first cross link and/or the second cross link.

One or more implementations of the aspect of the invention described immediately above include one or more of the following: the wobble joint includes a rotating hub with an axial center and a hole with an axial center that is offset relative to the axial center of the rotating hub; a compression trunnion received in the offset hole of the hub, and the offset compression trunnion coupling the internal coupling yoke to the first cross link and/or the second cross link; an off-centered balancing weight coupled to the rotating hub and configured to balance weight of the offset compression trunnion as the offset compression trunnion and off-centered balancing weight rotate with the hub; the wobble joint includes needle bearings; the universal joint includes a ball and socket centering mechanism; the internal coupling yoke is U-shaped; the universal joint includes ten bearing points; the universal joint is a joint of a front-wheel drive vehicle; the universal joint is a joint of a four-wheel drive vehicle; and/or the internal coupling yoke is inside the first ring cross link and the second ring cross link.

Another aspect of the disclosure involves a method of using a universal joint comprising a first ring cross link configured to be coupled to a driving yoke; a second ring cross link configured to be coupled to a driven yoke; an internal coupling yoke operably coupling yoke coupling the first ring cross link and the second ring cross link together, wherein at least one of the internal coupling yoke, the first cross link, and the second cross link include a wobble joint including an offset compression trunnion where the internal coupling yoke is coupled to the first cross link and/or the second cross link, the method comprising providing the driving yoke coupled to both the first ring cross link and the second ring cross link with the internal coupling yoke and at least one of the first cross link and the second cross link coupled together by the wobble joint including the offset compression trunnion; rotating the universal joint whereby the internal coupling yoke rotates relative to at least one of the first cross link and the second cross link via the offset compression trunnion and the wobble joint.

One or more implementations of the aspect of the invention described immediately above include one or more of the following: the wobble joint includes a rotating hub with an axial center and a hole with an axial center that is offset relative to the axial center of the rotating hub, and the compression trunnion is received in the offset hole of the hub, and whereby the internal coupling yoke rotates relative to at least one of the first cross link and the second cross link via the offset compression trunnion in the offset hole of the rotating hub; the universal joint further includes an off-centered balancing weight coupled to the rotating hub and configured to balance weight of the offset compression trunnion as the offset compression trunnion and off-centered balancing weight rotate with the hub, and the method further includes balancing weight of the offset compression trunnion with the off-centered balancing weight as the offset compression trunnion and off-centered balancing weight rotate with the hub; the wobble joint includes needle bearings, and whereby rotating includes rotating the universal joint whereby the internal coupling yoke rotates relative to at least one of the first cross link and the second cross link via the offset compression trunnion and the needle bearings of the wobble joint; the universal joint includes a ball and socket centering mechanism, and the method further including using the ball and socket centering mechanism for centering during use of the universal joint; the internal coupling yoke is U-shaped, and providing includes providing the driving yoke coupled to both the first ring cross link and the second ring cross link with the U-shaped internal coupling yoke; the internal coupling yoke is inside the first ring cross link and the second ring cross link, and providing includes providing the driving yoke coupled to both the first ring cross link and the second ring cross link with the internal coupling yoke inside of the first ring cross link and the second ring cross link; the universal joint includes ten bearing points; the universal joint is a joint of a front-wheel drive vehicle; the universal joint is a joint of a four-wheel drive vehicle; and/or the internal coupling yoke is inside the first ring cross link and the second ring cross link.

BRIEF DESCRIPTION OF DRAWINGS

The accompanying drawings, which are incorporated in and form a part of this specification illustrate embodiments of the invention and together with the description, serve to explain the principles of the invention.

DESCRIPTION OF EMBODIMENT OF THE INVENTION

Figure 1:
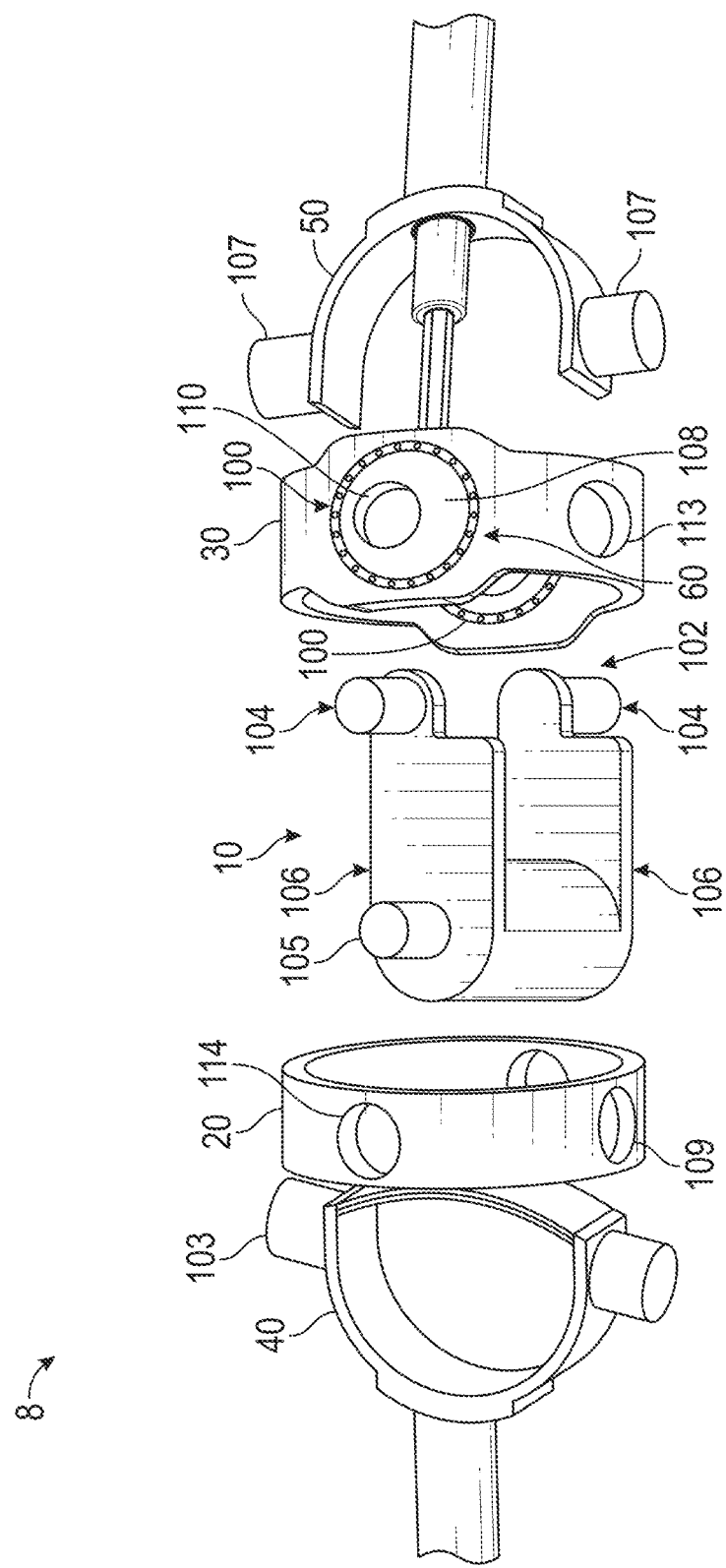
FIG. 1 is an exploded perspective view of an embodiment of a universal joint or CV-10 joint.
Figure 2:
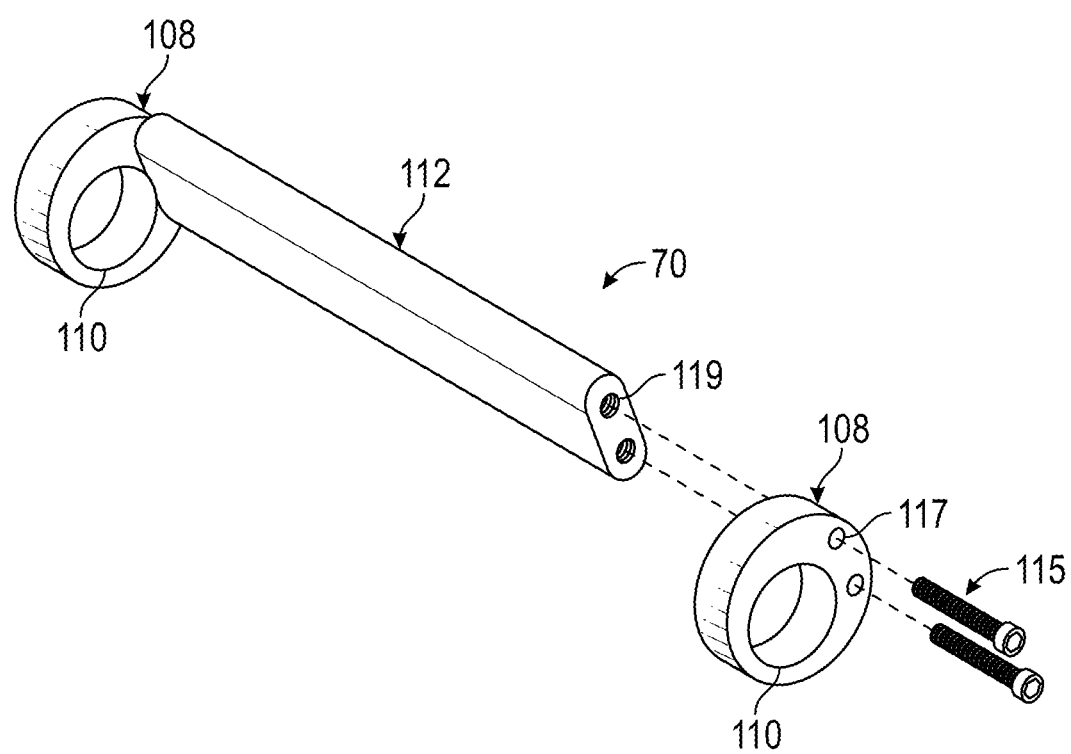
FIG. 2 is a perspective view of a bearing/wobble joint and balance weight/wobble joint connector of the universal joint of FIG. 1.
Figure 3:
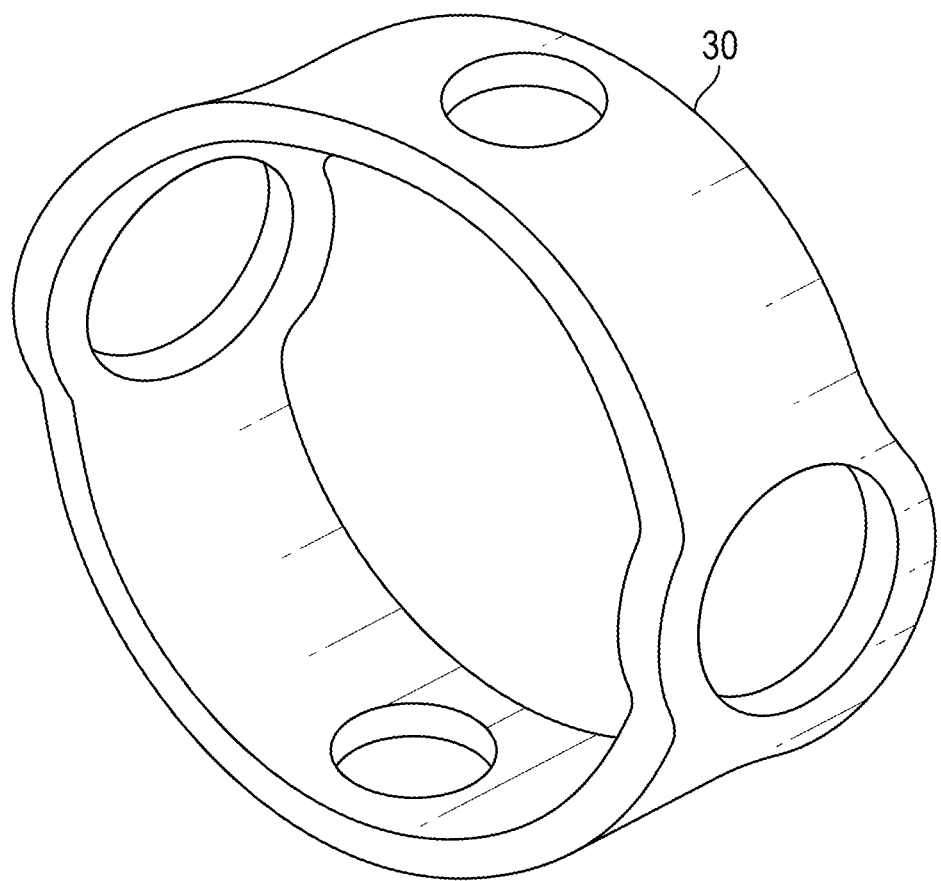
FIG. 3 is a perspective view of a ring cross link with wobble joint of the CV-10 joint of FIG. 1.
Figure 4:
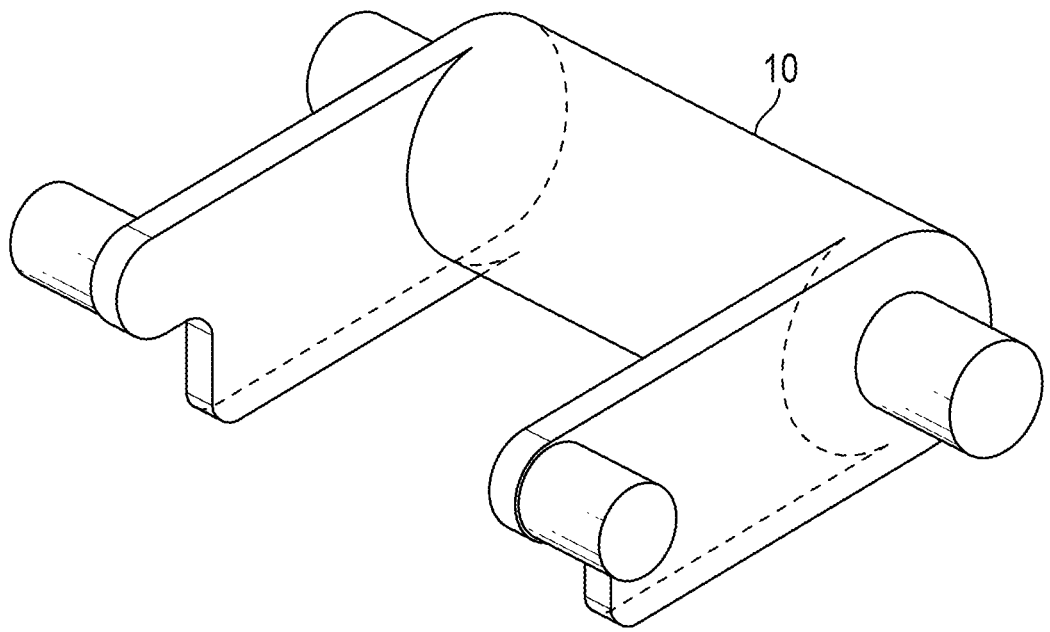
FIG. 4 is a perspective view of an internal coupling yoke of the CV-10 joint of FIG. 1.
Figure 5:
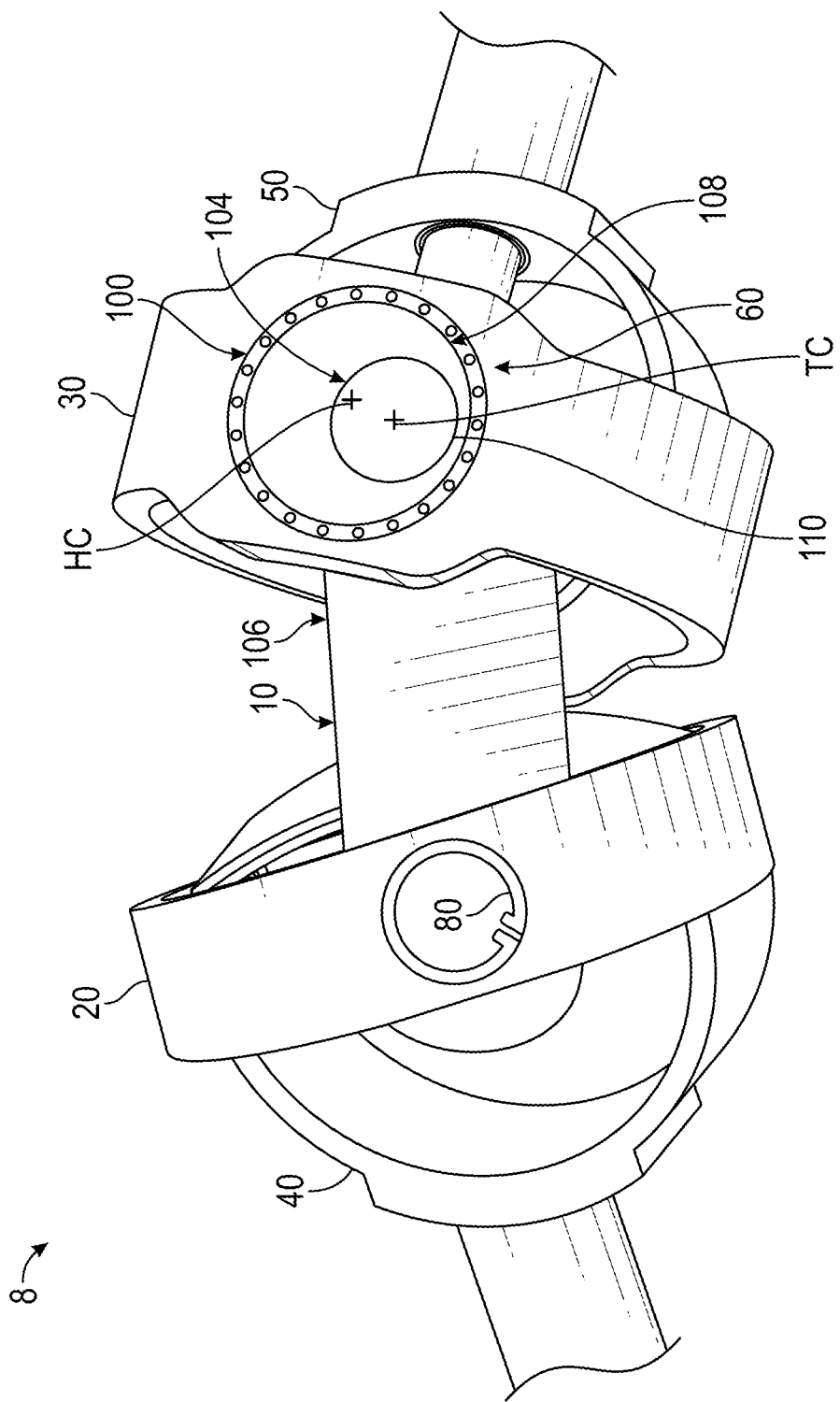
FIG. 5 is an assembled perspective view of the embodiment of the CV-10 joint of FIG. 1.
Figure 6:
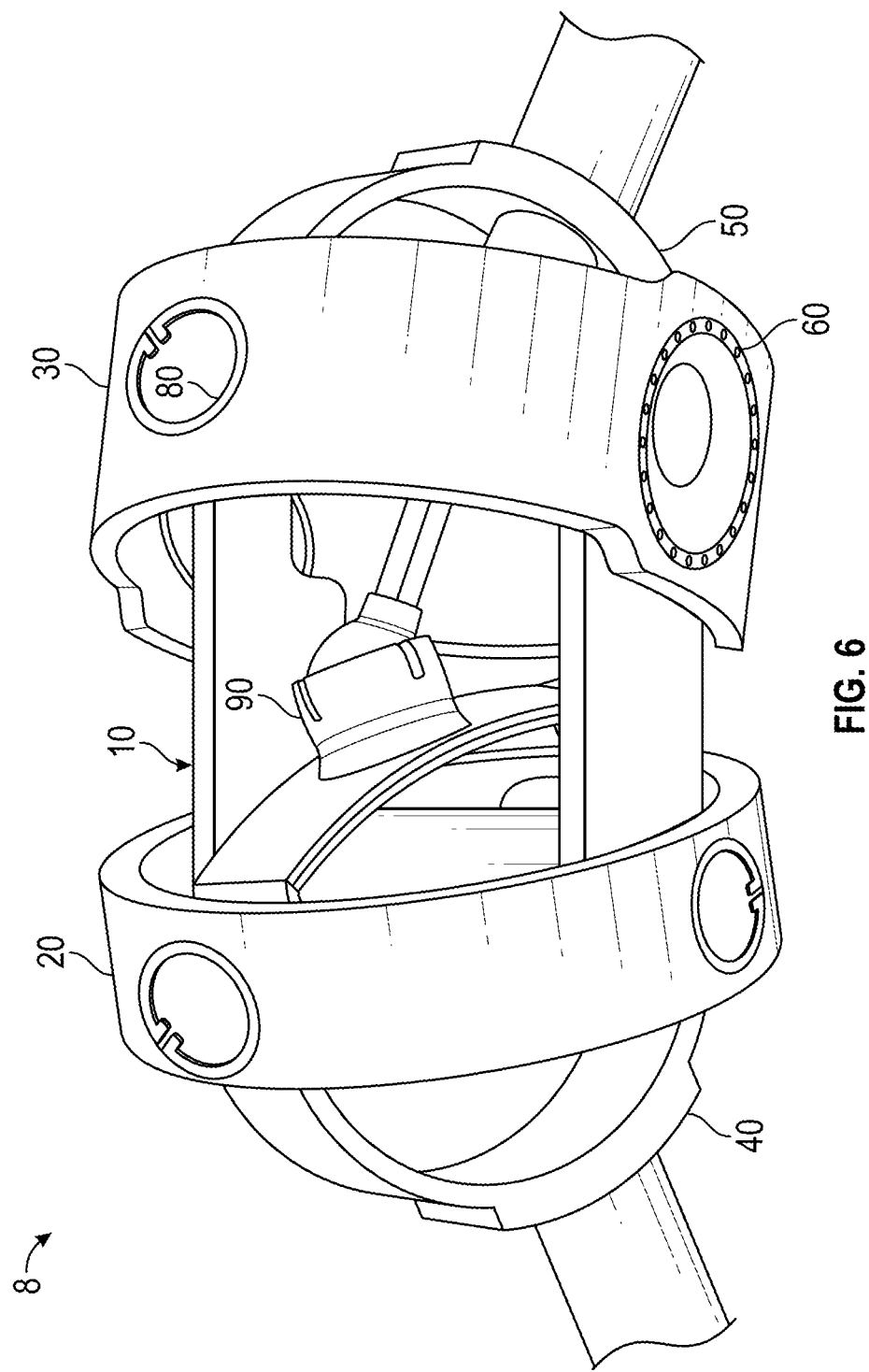
FIG. 6 is another assembled perspective view of the embodiment of the CV-10 joint of FIG. 1.
Figure 7:
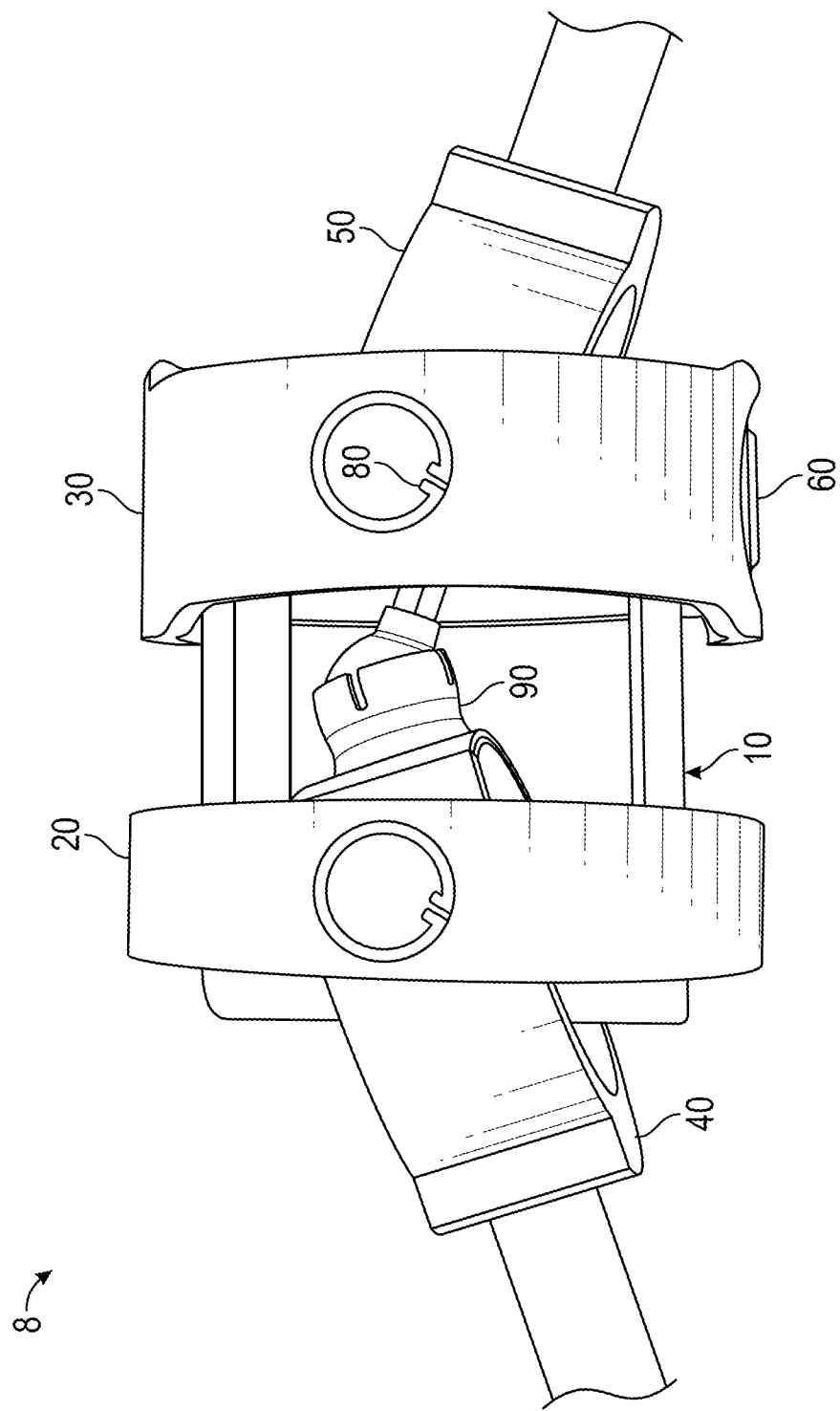
FIG. 7 is a further assembled perspective view of the embodiment of the CV-10 joint of FIG. 1.

With reference to FIGS. 1-7, an embodiment of a constant velocity universal joint or CV-10 ("CV-10 joint"), which is identified in the drawings by reference number 8 and will be described.

The CV-10 joint 8 includes a "U-shaped" internal coupling yoke 10, a first ring cross link 20, a second ring cross link with wobble joint 30, a driving yoke 40, a driven yoke 50, wobble joints 60, a balance weight/wobble joint coupler 70, a retaining clip 80, which hold bearing caps (not shown) carried by ring cross links 20, 30, and a centering mechanism/ball and socket 90.

The CV-10 joint 8 has a centering mechanism/ball and socket 90 and reduced friction provided by interconnected needle bearings 100. The benefits of the structure include reducing friction over the most common type of constant velocity joint by employing the needle bearings 100 everywhere where torque is being transferred. In addition, the strength of the structure doesn't diminish at high angles like the most common CV joints. Also, torque steer is greatly reduced because each plane of torque is perpendicular to the other and transferred to solid parts.

A driven end 102 of internal coupling yoke 10 includes trunnions/shafts 104 extending in opposite directions from yoke arms 106. Each wobble joint 60 includes a hub 108 within needle bearings 100 and including a trunnion receiving hole 110. The hub 108 includes an axial center HC and the trunnion receiving hole 110 includes an axial center TC that are offset from each other. Thus, when the driven end 102 of the internal coupling yoke 10 is coupled to the wobble joints 60, an axial center of trunnions 104/trunnion receiving hole center TC is offset from hub center HC, making trunnion 104 an offset compression trunnion 104.

Additional trunnions/shafts 103, 105, 107 are received in respective additional trunnion receiving holes 109, 111, 113 for operably coupling internal coupling yoke 10, the first ring cross link 20, and the driving yoke 40 together and operably coupling internal coupling yoke 10, the second ring cross link 30, and the driven yoke 50 together.

The CV-10 joint 8 can be used any place that constant velocity joints (CVJs) are being used now, anytime rotational power/torque needs to be accurately transferred at an angle from a source, mainly in cars to drive front wheels.

The extra needle bearings 100 and the wobble joints 60 solve this problem. By compressing at the wobble joints 60, this allows a regular cardan joint to pivot at essentially a single point, making it a CV-10 joint. This extra movement could lead to an out of balance. The driven end 102 and trunnions/shafts 104 of the internal coupling yoke 10 will move slightly out of center. The CV-10 joint 8 has very few moving parts so a small/light weight balancing member 112 is added to the balance weight/wobble joint coupler 70 coupling the needle bearings 100/wobble joint(s) 60. The small/light weight balancing member 112 is coupled to the hubs 108 via threaded fasteners 115, holes 117, threaded holes 119. The trunnions/shafts 104 and the weight balancing member 112) rotate opposite from each other to center the weight, preventing vibration. The CV-10 joint 8 has ten bearing points for the needle bearings 100 (not shown at all bearing points) and the centering mechanism/ball and socket 90. All torque is applied to the ten bearing points that use the needle bearings 100 and the centering mechanism/ball and socket 90.

The main applications of the CV-10 joint 8 would be to replace a Rzeppa joint in front wheel drive cars. Torque steer will be greatly reduced. Also, the steering wheel wobble on low traction surfaces and the overly fast return to center of the steering wheel on front wheel drive cars that happens when applying high power out of a turn will be reduced. Another application of the CV-10 joint 8 is for four-wheel drive trucks that use the stronger standard single universal joint, in the front wheels, for strength. The stronger standard single universal joint is often disconnected and the four-wheel drive trucks driven in second gear for on road use to avoid the variable speed problems inherent in a single standard universal joint. A stronger CVJ would allow part time four-wheel drive vehicles to be full time four-wheel drive vehicles like the CV-10 joint 8.

Important in the CV-10 joint 8 are the "U-shaped" internal coupling yoke 10 that couples the ring cross links 20, 30 together, the wobble joints 60, the balance weight/wobble joint coupler 70, and the needle bearings 100. This combination allows room for the internal coupling yoke 10 as opposed to an external coupling yoke. Making a ring cross link leaves room for the wobble joint 60. This allows the whole CV-10 joint 8 to compress and to bend at essentially a single point. The internal yoke 10 will get slightly out of balance when the wobble joint 60 compresses. The weight balancing member 112 of the balance weight/wobble joint coupler 70 moves out in the opposite direction to compensate.

In one or more embodiments, at least one of the internal coupling yoke 10, the first cross link 20, and the second cross link 30 include the wobble joints 60 where the internal coupling yoke 10 is coupled to the first cross link 20 and/or the second cross link 30.

In one or more embodiments, the above-described and/or shown hole(s) (e.g., hole 110) may be replaced with the above-described and/or shown shaft(s) (e.g., trunnion/shaft 104) and vice versa.

The figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method of using a universal joint, the universal joint comprising a first ring cross link configured to be coupled to a driving yoke; a second ring cross link configured to be coupled to a driven yoke; an internal coupling yoke operably coupling the first ring cross link and the second ring cross link together, wherein at least one of the internal coupling yoke, the first cross link, and the second cross link include a wobble joint where the internal coupling yoke is coupled to the first cross link and/or the second cross link, comprising:

providing the driving yoke coupled to both the first ring cross link and the second ring cross link with the internal coupling yoke and at least one of the first cross link and the second cross link coupled together by a wobble joint including an offset compression trunnion;

rotating the universal joint whereby the internal coupling yoke rotates relative to at least one of the first cross link and the second cross link via the offset compression trunnion and the wobble joint.

2. The method of claim 1, wherein the wobble joint includes a rotating hub with an axial center and a hole with an axial center that is offset relative to the axial center of the rotating hub, and the compression trunnion is received in the offset hole of the hub, and whereby the internal coupling yoke rotates relative to at least one of the first cross link and the second cross link via the offset compression trunnion in the offset hole of the rotating hub.

3. The method of claim 1, wherein the wobble joint includes a rotating hub and an off-centered balancing weight coupled to the rotating hub and configured to balance weight of the offset compression trunnion as the offset compression trunnion and off-centered balancing weight rotate with the rotating hub, and the method further includes balancing weight of the offset compression trunnion with the off-centered balancing weight as the offset compression trunnion and off-centered balancing weight rotate with the rotating hub.

4. The method of claim 1, wherein the wobble joint includes needle bearings, and whereby rotating includes rotating the universal joint whereby the internal coupling yoke rotates relative to at least one of the first cross link and the second cross link via the offset compression trunnion and the needle bearings of the wobble joint.

5. The method of claim 1, wherein the universal joint includes a ball and socket centering mechanism, and the method further including using the ball and socket centering mechanism for centering during use of the universal joint.

6. The method of claim 1, wherein the internal coupling yoke is U-shaped, and providing includes providing the driving yoke coupled to both the first ring cross link and the second ring cross link with the U-shaped internal coupling yoke.

7. The method of claim 1, wherein the internal coupling yoke is inside the first ring cross link and the second ring cross link, and providing includes providing the driving yoke coupled to both the first ring cross link and the second ring cross link with the internal coupling yoke inside of the first ring cross link and the second ring cross link.

* * * * *